United States Patent [19]

Takeda et al.

[11] Patent Number: 4,882,117
[45] Date of Patent: Nov. 21, 1989

[54] INJECTION MOLDING PROCESS FOR MOLTEN PLASTIC

[75] Inventors: Yoshinobu Takeda; Kunio Yamamoto, both of Niigata, Japan

[73] Assignee: Mitsubishi Kinzoku Kabushiki Kaisha, Tokyo, Japan

[21] Appl. No.: 212,149

[22] Filed: Jun. 28, 1988

Related U.S. Application Data

[63] Continuation-in-part of Ser. No. 53,537, May 26, 1987, abandoned, which is a continuation of Ser. No. 766,005, Aug. 15, 1985, abandoned.

[30] Foreign Application Priority Data

Aug. 16, 1984 [JP] Japan ................. 59-170705

[51] Int. Cl.⁴ .............................. B29C 45/70
[52] U.S. Cl. ................. 264/328.9; 264/40.5; 264/328.7; 264/328.12; 264/328.16; 425/149; 425/150
[58] Field of Search ................ 264/40.1, 40.5, 328.1, 264/328.7, 328.8, 328.9, 328.11, 328.12, 328.13, 328.14, 328.16; 425/145, 149, 150

[56] References Cited

U.S. PATENT DOCUMENTS

| | | | |
|---|---|---|---|
| 2,685,708 | 8/1954 | Pollock . | |
| 3,940,465 | 2/1976 | Hauser et al. | 264/40.5 |
| 4,131,596 | 12/1978 | Allen | 425/150 |
| 4,205,950 | 6/1980 | Suss et al. . | |
| 4,237,089 | 12/1980 | Kubat et al. | 264/328.1 |
| 4,313,901 | 2/1982 | Chu . | |
| 4,325,896 | 4/1982 | Rodgers, Jr. . | |
| 4,349,324 | 9/1982 | Neff et al. | 425/149 |
| 4,366,110 | 12/1982 | Morita et al. . | |
| 4,609,516 | 9/1986 | Krishnakumar et al. | 264/328.12 |

FOREIGN PATENT DOCUMENTS

| | | |
|---|---|---|
| 41806/78 | 12/1979 | Australia . |
| 2532429 | 1/1977 | Fed. Rep. of Germany . |
| 2535426 | 2/1977 | Fed. Rep. of Germany . |
| 2612176 | 10/1977 | Fed. Rep. of Germany . |
| 1116870 | 4/1958 | France . |
| 2354189 | 1/1978 | France . |
| 2391059 | 12/1978 | France . |
| 50-80358 | 6/1975 | Japan . |
| 57-74135 | 5/1982 | Japan . |
| 59-64336 | 4/1984 | Japan . |
| 59-165634 | 9/1984 | Japan . |

OTHER PUBLICATIONS

Caoutchoucs et Plastiques, No. 634, Oct. 1963—Injection Molding Measuring the Pressure inside the Mold.

Primary Examiner—Jan H. Silbaugh
Assistant Examiner—Jill L. Heitbrink
Attorney, Agent, or Firm—Cushman, Darby & Cushman

[57] ABSTRACT

An injection molding process in which an injection of a molten resin into a cavity is performed under such a condition that an internal resin pressure upon filling of the cavity with the molten resin is lower than a maximum internal resin pressure required upon pressure holding after the filling.

1 Claim, 3 Drawing Sheets

INJECTION MOLDING PROCESS FOR MOLTEN PLASTIC

This is a continuation-in-part of application Ser. No. 07/053,537, filed May 26, 1987; which was a continuation of Ser. No. 06/766,005, filed Aug. 15, 1985, which are both abandoned.

BACKGROUND OF THE INVENTION

1. Field of the Invention

The present invention relates to an injection molding process for molten plastic or resin.

2. Prior Art

A conventional process for injection molding is well known in the art. A plastic pellet is fed into a hopper of a injection molding machine such as an extruder. In the extruder, the plastic pellet is carried in a cylinder having a piston or a screw carrier and heated to produce a molten plastic. The molten plastic is extruded via a nozzle into a die assembly. The molten plastic is then maintained or held in the die assembly to provide a mold product. There are two types of pressures at the cylinder and the die assembly. A plunger pressure, that is, an injection pressure is created on the piston or screw in the cylinder while an internal resin pressure for molten plastic occurs in the die assembly.

FIG. 1 shows a graph of the plunger pressure of the piston or screw of the conventional extruder vs. the internal resin pressure within a cavity defined in the die assembly when a molding is produced according to the conventional injection process. As shown in FIG. 1, the plunger pressure of the extruder is increased to a maximum ram pressure upon filling the molten resin to the die assembly. Upon holding and cooling the molten plastic the plunger pressure is decreased to the intermediate pressure and then to a minimum ram pressure. It should be noted that the internal resin pressure according to conventional molding process has a synchronous pressure variation to that of the plunger pressure. The internal resin pressure is therefore increased upon filling the molten resin to the die assembly, with substantially following a trace of the plunger pressure. The internal resin pressure then gradually is decreased upon holding and cooling the molten resin in the die assembly since the molten resin is gradually cooled and solidified with a slight shrinkage of the resin. Such pressure change is considered to result from various factors such as, for example, the plunger pressure generated by a hydraulic pressure system, the volume or capacity of the cavity in the mold assembly, the flow resistance of molten resin against a passage from the nozzle to the cavity, a diameter of a gate facing to the cavity and the like. The most effective factor to be considered is that a volume of the cavity to be extruded does not change upon filling and holding the molten plastic in the die assembly by the predetermined mold clamping force. A filling time is also effective to prevent the mold surface under cooling from flashing.

An extruded area EA of the molten resin with an internal resin pressure IRP to a die assembly having a fixed mold clamping force MCF has an upper limit defined by:

$$EA \times IRP = MCFmax$$

If the value of the EA×IRP, that is, the MCFmax exceeds the mold clamping force of the die assembly, as shown in FIG. 5, a space or gap 3 between surfaces 1a and 2a of respective male and female dies 1 and 2 is provided with an opening amount h. The molten resin M therefore enters the gap 3 to cause a flash Ma to occur on a molded article. This would result in poor products and sometimes in interruption of the molding. On the other hand, in order to increase a filling density of the molded article to a value higher than a predetermined value, it is required to increase the internal resin pressure to a value higher than a predetermined value and, after all, the extruded area of the molten resin is limited by the mold clamping force of the die assembly.

SUMMARY OF THE INVENTION

It is therefore an object of the present invention to provide an injection molding process which enables an article to be molded, which article has an extruded area greater than a conventional upper limit, by a conventional injection molding machine without occurrence of any flash.

According to the present invention, there is provided an injection molding process comprising the step of, upon filling a cavity with a molten resin, injecting the molten resin at the internal resin pressure lower than a maximum internal resin pressure required upon pressure holding after the filling.

Because the internal resin pressure upon the filling is low, the flow rate, i.e., filling velocity of the molten resin within the cavity is decreased and, accordingly, it takes long time that the molten resin reaches distal end of the cavity, so that during the movement a thin or shallow layer of the molten resin in contact with the die assembly is well cooled and solidified to form a thin hardened layer. The inside of the thin hardened layer is under molten condition, and the holding pressure is applied through the interior molten resin to the entire solid resin. At this time, if the current force (EA×IRP) which exceeds the mold clamping force of the die assembly should be applied to the resin to move the male and female dies away from each other to define a gap therebetween, the molten resin would not enter the gap because of the presence of the thin hardened layer. Accordingly, no flash would occur on a molded product. Subsequently, the interior molten resin is also cooled and solidified.

DETAILED DESCRIPTION OF THE PREFERRED EMBODIMENT

Figure 2:
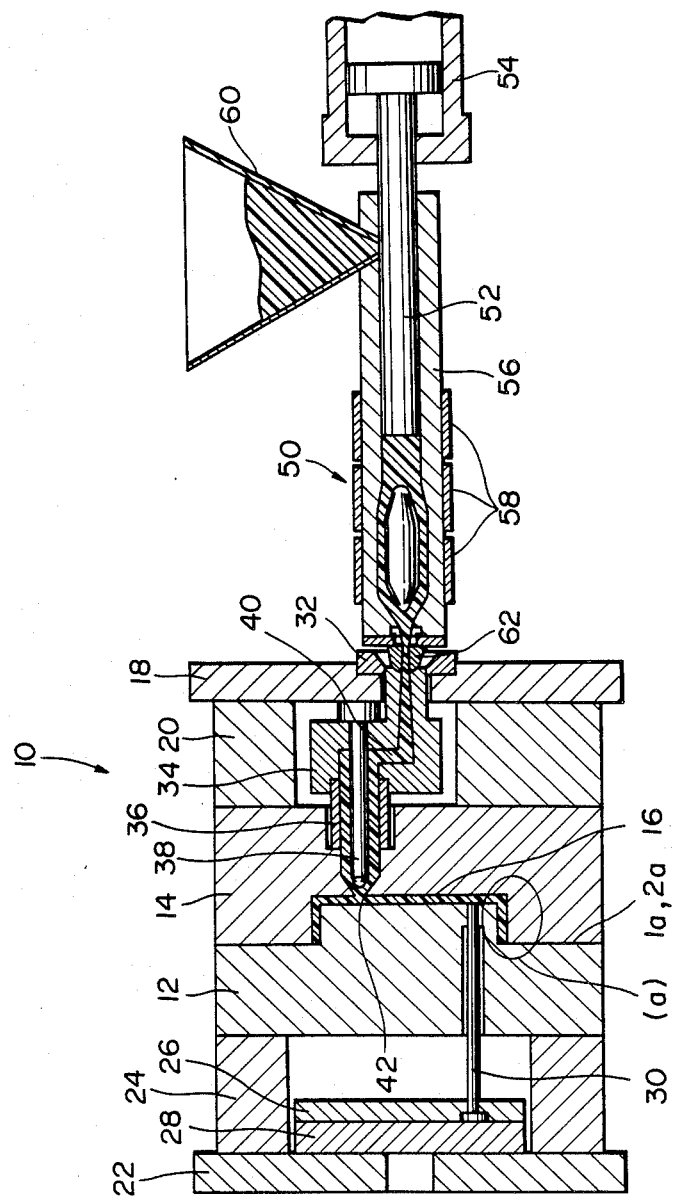
FIG. 2 is a cross-sectional view showing a die assembly and an injection molding machine, to which the present invention is applicable.

An embodiment of the present invention will now be described with reference to FIGS. 2 to 6 of the accompanying drawings. FIG. 2 is a cross-sectional view of a die assembly generally designated by the reference 10, and an injection molding machine such as a extruder generally designated by the reference 50.

The die assembly 10 is substantially identical in construction with a conventional one known to those skilled in the art, and will be described briefly. The die assembly 10 comprises a male die 12 and a female die 14 between which a cavity 16 is provided to fill a molten resin. The cavity 16, in this embodiment, is in the form of a shallow cup. The female die 14 therefore is mounted on a fixed bottom plate 18 through a spacer 20. The bottom plate 18 is adjustably in position disposed on a base (not shown). While the male die 12 is mounted on a movable bottom plate 22 through a spacer 24. The movable bottom plate 22 also accessibly disposed on the base. A pair of ejector plates 26 and 28 are movably mounted on the ejector guides (not shown) provided between the 12 and 22, with an ejector pin 30 extending from the ejector plates 26 and 28 away from the bottom plate 22. The movable bottom plate 22 is so slid on the base that the ejector pin 30 causes the mold product to eject from the cavity. The fixed bottom plate 18 has mounted thereon a locating ring 32 and a manifold 34 interfacing the extruder 50 to the die assembly 10. A runner bush 36 is mounted between the female die 14 and the manifold 34, and a torpedo spreader 38 extends into and through the runner bush 36. The female die 14, the runner bush 36 and the manifold 34 have formed therein a runner 40 communicating with a gate 42 which faces to the cavity 16. In this embodiment, the die assembly 10 has two cavities 16 each of which has a conventional cavity size with the characteristics shown in FIG. 6. In other words, the die assembly 10 has a extruded area twice that of the conventional die assembly. Molten resin from the extruder 50 is simultaneously injected into each of the cavities 16. The gate 42 facing to each cavity 16 has a diameter greater than, 1.6 times, for example, that of a gate in the conventional die assembly.

The extruder 50 is also substantially identical in construction with a conventional one known to those skilled in the art, and will be described briefly. A plunger 52 which is reciprocally actuated by a hydraulic cylinder 54 is slidably received in a heating barrel 56 which is heated by a heater 58. A hopper 60 is mounted on the heating barrel 56 adjacent to one end thereof, and a nozzle 62 is provided at the other end or tip of the heating barrel 56.

Alternatively a screw rod for carrying the molten resin may be used. The screw rod is so rotatably mounted within the heating barrel 56 as to produce the plunger or ram pressure.

Figure 1:
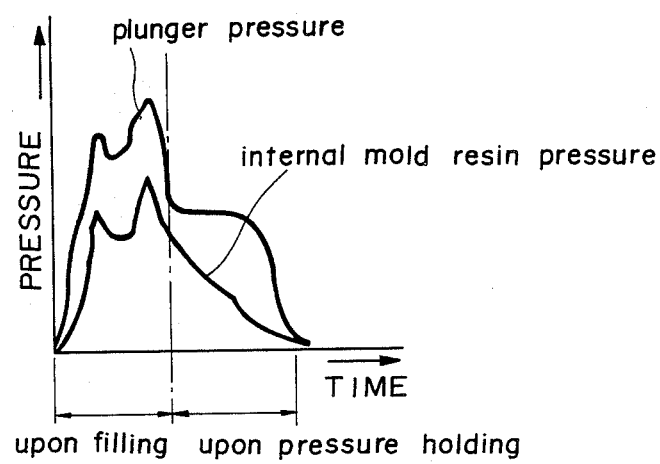
FIG. 1 is a graph showing the characteristics of the conventional injection molding method.

An injection molding is performed by the above-described die assembly 10 and the extruder 50. In this case, if the plunger pressure, i.e., the pressure applied by the plunger 52 to the molten resin within the heating barrel 56 is the same as that in the conventional extruder, in other words, if the hydraulic pressure in the hydraulic cylinder 54 is the same as a conventional one, the injection molding is performed in a pattern of pressure change as shown in FIG. 1. Specifically, the internal resin pressure is sufficiently low upon the filling, and the internal resin pressure higher than the pressure upon the filling is maintained upon the pressue holding. The internal resin pressure upon the pressure holding should be increased to a level higher than that required for increasing a filling density of a molded article.

Figure 3:
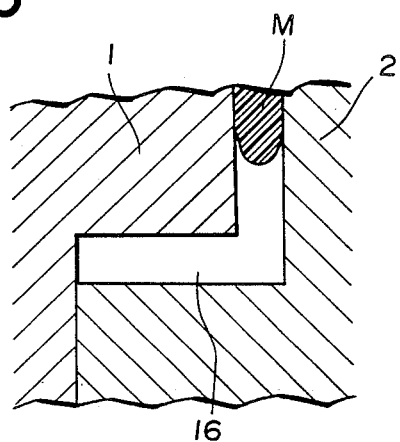
FIG. 3 is a fragmentary enlarged cross-sectional view of a portion of a cavity encircled by a in FIG. 2, showing a condition of a filling stage.
Figure 4:
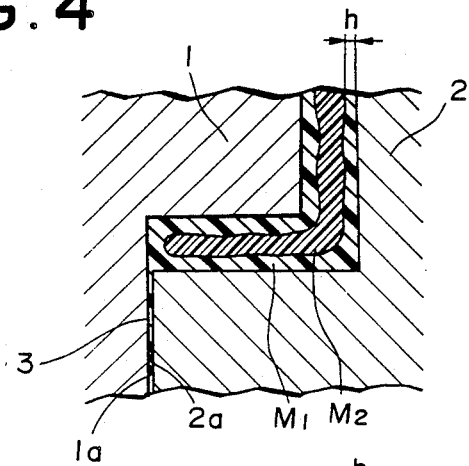
FIG. 4 is a view similar to FIG. 3, but showing a condition immediately after the filling.
Figure 5:
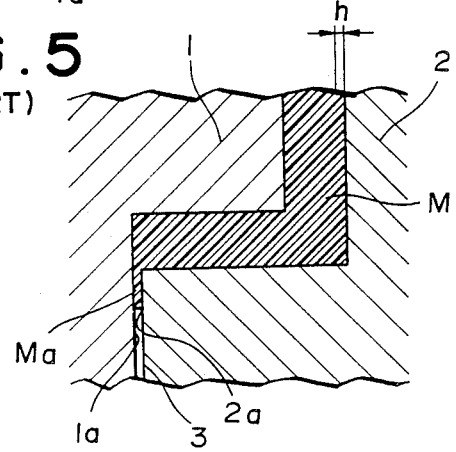
FIG. 5 is a view similar to FIG. 3, but showing a condition immediately after the filling in accordance with a conventional injection molding method.

When the molding is performed in such pattern of pressure change, the molten resin reaches the distal end of the cavity by means of the filling stage shown in FIG. 3. However, as described hereinbefore, because the internal resin pressure upon the filling is low, the filling rate or velocity of the molten resin is decreased. As shown in FIG. 4, a thin layer of the resin in contact with the male and female dies 1 and 2 is well cooled and solidified to form a thin hardened layer $M_1$. The inside of the thin hardened layer $M_1$ is under molten condition, and the holding pressure is applied to the entire resin through the interior molten layer $M_2$. In this manner, because the thin hardened layer $M_1$ is formed, should split surfaces 1a and 2a of the respective male and female dies 1 and 2 be moved away from each other to form therebetween a gap 3, the molten resin would not enter the gap 3, so that no flash would occur on the molded article. In addition, since the resin is filled in the entire cavities at a relatively low internal resin pressure, it is possible to obtain molded articles which have a less possibility that internal stress is developed.

Figure 6:
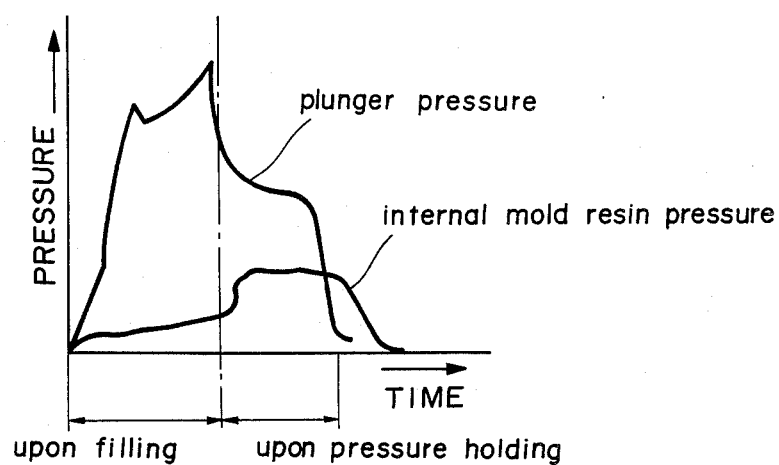
FIG. 6 is a graph similar to FIG. 1, but showing relations between time and a plunger pressure and an internal resin pressure, in accordance with an embodiment of the present invention.

Although the illustrated embodiment has been described as being applied to such injection molding construction and arrangement that the molded articles are twice in number that or those molded by the conventional molding method and the gate diameter is approximately 1.6 times that used in the conventional molding process, the present invention should not be limited to this embodiment, but may applicable to any injection molding construction and arrangement, provided that as shown in FIG. 6 the molding is performed under such a condition that internal resin pressure upon filling is lower than the holding pressure. Accordingly, in place of the increase in number of the molded article, a extruded area of an article to be molded per se may be increased. In addition, the plunger may be decreased in feed rate, while the extruded area of the molded article per se is maintained as in the past.

As described above, in accordance with the present invention, since the injection is performed under such a condition that the internal resin pressure upon the filling is lower than the internal resin pressure upon the pressure holding, the filling speed or rate of the molten resin is decreased to allow the thin layer of the resin in contact with the die assembly to be formed into the thin hardened layer, so that should the dies are moved away from each other by the force exceeding the mold clamping capacity of the molding machine, no flash would be produced. Accordingly, as compared with the conventional molding method, should a molding machine having the same mold clamping capacity be utilized, it would be possible to mold an article having a greater extruded area. In addition, since the thin hardened layer is formed, no flash would be produced, should the molds be more or less poor in dimensional accuracy so that a gap originally exists between the split surfaces of the respective dies.

It is important in the present invention to control the clamping force relative to the pressure in the holding step. Thus, for a mold cavity having an extruded surface area A, which is the same as the Extruded Area, previously noted, where the foregoing method is carried out, during the holding step, the clamping force F of the clamping means should be set to satisfy the following relationship:

$$F \leq P \times A$$

where P is the maximum of the pressure of the resin within the cavity during the holding step and A is the internal surface area of the cavity.

What is claimed is:

1. An injection molding process comprising the steps of:
   (a) providing an injection molding press comprising a male die, a female die for being clamped together with said male die to define at least one cavity having extrusion surface area A therebetween, a clamping means for clamping said male and female dies together with a prescribed clamping force F, means for injecting a molten resin into said cavity at a prescribed injecting pressure and holding said resin injected in said cavity with a prescribed holding pressure;
   (b) clamping said male and female dies together with said clamping force F to provide said cavity therebetween;
   (c) subsequently injecting the molten resin at said prescribed injection pressure into said cavity by said means to fill said cavity with said molten resin, the injection pressure being controlled so as to increase the pressure of the molten resin within said cavity gradually with the passage of time to prevent a pressure boost from occurring upon the termination of the injecting step, while moving said molten resin within said cavity at such a speed that the portion of said molten resin in contact with the surfaces of said cavity is solidified to form a thin hardened layer on the cavity surfaces; and
   (d) subsequently holding said molten resin filled in said cavity at said prescribed holding pressure to solidify the resin within the cavity to produce a molded article, said holding pressure being controlled so as to increase the pressure of the resin within said cavity to a maximum initially during said holding step and to maintain said maximum level substantially throughout said holding step;
   said clamping force F of said clamping means being set so as to satisfy the following relationship:

$$F < P \times A$$

where P is said maximum of said pressure of the resin within said cavity during the holding step so that no flash will result in the event a gap is open between said dies due to the existence of the thin hardened layer.

* * * * *